(No Model.)

G. W. SWARTZ.
GEARING FOR ELECTRIC LOCOMOTIVES.

No. 513,599. Patented Jan. 30, 1894.

Witnesses
L. C. Hills
E. H. Bond

Inventor:
George W. Swartz,
By E. B. Stocking
Attorney

THE NATIONAL LITHOGRAPHING COMPANY,
WASHINGTON, D. C.

UNITED STATES PATENT OFFICE.

GEORGE W. SWARTZ, OF FLORENCE, ALABAMA.

GEARING FOR ELECTRIC LOCOMOTIVES.

SPECIFICATION forming part of Letters Patent No. 513,599, dated January 30, 1894.

Application filed October 6, 1892. Serial No. 448,090. (No model.)

*To all whom it may concern:*

Be it known that I, GEORGE W. SWARTZ, a citizen of the United States, residing at Florence, in the county of Lauderdale, State of Alabama, have invented certain new and useful Improvements in Gearing for Electric Locomotives, of which the following is a specification, reference being had therein to the accompanying drawings.

This invention relates to certain new and useful improvements in electrically-propelled vehicles and it has for its objects among others to provide a compact, simple, cheap and efficient construction, readily applicable to trucks now in use and by which I am enabled to get driving power in contact with both axles by the employment of a single motor.

The invention is capable of embodiment in a variety of forms and although I have chosen to show some of those which I at present consider the most practicable I do not intend to limit myself thereto.

I employ a motor arranged between the axles and upon each end of its shaft carrying a friction wheel revolving between two friction disks which are actuated to and from the said friction wheels by electrical devices under the control of the motor-man on the car to stop or reverse the movement of the car. The magnets employed for this purpose may be arranged in a variety of ways, some of which are illustrated in the accompanying drawings, and the friction wheels and disks may assume different shapes according to the circumstances under which they are to be used. The friction wheels on the motor shaft are movable lengthwise thereon to increase or decrease the speed and oppositely affect the driving power.

Other objects and advantages of the invention will hereinafter appear and the novel features thereof will be specifically defined by the appended claim.

The invention is clearly illustrated in the accompanying drawings, which, with the letters of reference marked thereon form a part of this specification, and in which—

Figure 1:
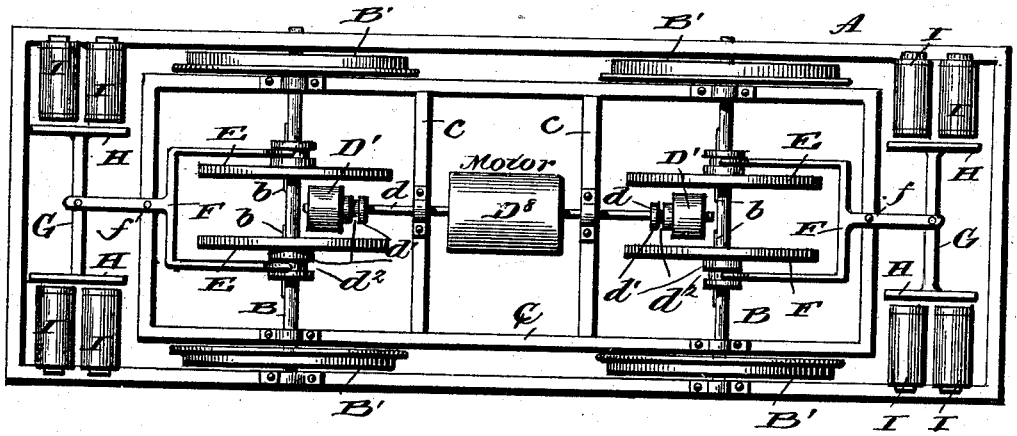
Figure 2:
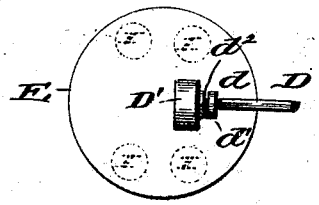

Figure 1 is a plan view of a locomotive embodying my invention. Fig. 2 is a detail in elevation.

Like letters of reference indicate like parts throughout the several views in which they appear.

Referring now to the details of the drawings by letter, A designates the frame-work and B the axles of a truck or car, and B' the wheels of known construction. The axles are journaled in suitable bearings or boxes as shown and are formed with splines $b$ for a purpose which will soon be explained.

C is an inner frame having bearings for the axles as shown, and in suitable bearings or boxes in the cross bars $c$ of this inner frame is supported the motor shaft D, $D^8$ designating a motor of any suitable construction. This motor shaft carries at each end a friction wheel D' which may be of any desired shape, and these friction wheels are slidingly supported upon the shaft, in any suitable manner, as for instance by means of splines $d$ as seen in Fig. 1 working in key ways in the wheels so that they may be moved endwise on the shaft and still at all times revolve therewith. The said wheels are provided with collars $d'$ grooved as seen at $d^2$ to receive a clutch or any suitable device under the control of the motor-man whereby they may be moved in or out as may be desired, but as this shifting means forms no part of this invention, any convenient means being applicable, it is not shown.

In Fig. 1 E are disks slidingly supported on the axles in any suitable manner so as to revolve therewith and yet capable of movement lengthwise of the axle when desired; a spline being the preferable way as shown. These disks, that is the two upon each axle, are simultaneously actuated in the same direction relatively to the length of the axle, and preferably in the following manner.

F is a yoke or clutch pivoted at $f$ on the end cross bar of the inner frame as shown, and each arm of the yoke or clutch is forked and engages in the groove $d^2$ of the collar $d'$ as shown so that when the yoke is actuated the disks will be moved in one direction or the other. It will be understood that there is preferably one yoke at each end of the car as shown, and to the outer end of the yoke is attached a cross bar G carrying at each end an armature H which are arranged as shown so as to be attracted by the electro magnets I which are suitably supported on the car frame, there being a set of these magnets upon each side of the car at each end. These magnets are under the control of the motor-man and are designed to operate in pairs, that is, the one at one side upon one end operates with the one upon the other side at the other end and vice versa, so that the diagonally-opposite sets attract the armatures. When the current of electricity is switched so that one set of magnets attract the armatures the yokes will be moved on their pivots so as to throw the disks in contact with the friction wheels and the car is propelled in one direction; when the current is switched into the other set of magnets the disks are moved in the opposite direction and the motion of the car reversed. When it is desired to stop the car the yokes are moved so that the friction wheels will not be in contact with either set of disks. They are shown in such position in Fig. 1. All this will be under the control of the motor-man and suitable means as an index should be arranged upon the car so that by moving the lever to the proper point he can move the disks just the desired amount. It will be observed that by this arrangement, there is no necessity of reversing the motion of the motor shaft and hence flashing or sparking at the brushes is prevented, and a steady backward or forward motion of the locomotive is provided for.

What I claim as new is—

The combination, with the frame and the axles, of an inner frame having bearings for said axles, a motor supported in the inner frame and having longitudinal shaft extended at both ends, friction wheels on the ends of said shaft, the pivoted yokes, the cross bars pivoted to the extensions of the yokes, armatures on the ends of the cross bars and electro-magnets arranged in operative relation to the armatures, substantially as described.

In testimony whereof I affix my signature in presence of two witnesses.

GEORGE W. SWARTZ.

Witnesses:
W. T. EATON,
E. C. CROW.